United States Patent [19]

Spring

[11] Patent Number: 5,796,606
[45] Date of Patent: Aug. 18, 1998

[54] PROCESS INFORMATION AND MAINTENANCE SYSTEM FOR DISTRIBUTED CONTROL SYSTEMS

[75] Inventor: Robert A. Spring, Pointe-Claire, Canada

[73] Assignee: Noranda Inc., Toronto, Canada

[21] Appl. No.: 598,021

[22] Filed: Feb. 7, 1996

[51] Int. Cl.$^6$ .................................................. G06F 19/00
[52] U.S. Cl. ........................ 364/138; 364/184; 364/188; 364/551.01
[58] Field of Search ................................. 364/131–136, 364/138, 139, 146, 188, 189, 550, 551.01, 184, 185, 178, 179, 552, 554; 340/517–525

[56] References Cited

U.S. PATENT DOCUMENTS

| | | | |
|---|---|---|---|
| 3,779,731 | 12/1973 | Pollock et al. | 364/184 X |
| 4,197,576 | 4/1980 | Sanchez | 364/106 |
| 4,816,208 | 3/1989 | Woods et al. | 364/188 X |
| 4,902,469 | 2/1990 | Watson et al. | 364/525 X |
| 5,089,978 | 2/1992 | Lipner et al. | 364/551.01 |
| 5,353,315 | 10/1994 | Scarola et al. | 364/188 X |

FOREIGN PATENT DOCUMENTS

| | | | |
|---|---|---|---|
| 2130277 | 2/1995 | Canada | H02P 9/10 |

OTHER PUBLICATIONS

Notification Of Transmittal Of International Search Report dated Jun. 10, 1997.
Chemie–Technik, Sep., (1992), No. 9, Heidelberg, DE w/two abstracts.
Comm. And Control In Small Batch Part Manufacturing, J.J. Tiemersma, W. Curtis and H.J.J. Kals, (Feb. 1993).
Advances In Instrumentation And Control 46 (Jan. 1991) Part 2, Research Triangle Park, NC, US Process Control Architectures Using Workstation/X Windows Technology, Greg R. Vetter and Jeanne F. Bojarski.
Tappi Process Control Textbook, "Process control fundamentals for the pulp and paper industry", 1995, pp. 1, 8–11, 17, 58 & 215.
Control System '92, Closing remarks by Guy A. Dumont, Oct. 1, 1992, pp. 1–4.
Control System '92, Champagne M.J.R., "Mill experience with automated loop–tuning systems" 1992, pp. 187–190.
Rhinehart, "A watchdog for controller performance monitoring", Proceedings of the American Control Conference, Jun. 1995, pp. 2239–2240.
Harris, "Assessment of control loop performance", Can. J. Chem. Eng., 1989, 67, 856–861.
Jofriet et al., "An expert system for control loop performance analysis", 81rst annual meeting, Technical Section, CPPA, pp. B41–B49; date unknown.
Stanfelj et al., "*Monitoring and diagnosing process control performance: the single loop case*" Proceedings of the American Control Conference, 1991, pp. 2886–2892.
Hägglund, "*Automatic Monitoring of control loop performance*", Control System 94, May 31–Jun. 2, 1994, pp. 190–196.
Perrier et al., "*Towards mill–wide evaluation of control loop performance*", Control System 92, May 31–Jun. 2, 1994, pp. 190–196.
Fadum, The Fadum Report, Mar. 1992, pp. 1 & 8.
Fadum, The Fadum Report, Aug. 1993, pp. 9–10.
Fadum, The Fadum Report, Sep. 1993, p. 3.

*Primary Examiner*—Joseph Ruggiero
*Attorney, Agent, or Firm*—Fitzpatrick, Cella, Harper & Scinto

[57] ABSTRACT

A process information and maintenance system for monitoring, visualizing, triaging and maintaining all control loops of a distributed control system gives the users the number of control loops in the plant, the number of loops that are routinely in manual mode, which loops are frequently in alarm, which loops need tuning, etc.

7 Claims, 10 Drawing Sheets

PROCESS INFORMATION AND MAINTENANCE SYSTEM FOR DISTRIBUTED CONTROL SYSTEMS

FIELD OF THE INVENTION

The system of the present invention is a process information and maintenance tool for distributed control systems. It continuously acquires data from the distributed control system and gives the user the number of control loops in the plant, the number of loops that are routinely in manual mode, which loops are frequently in alarm, which loops need tuning, etc.

BACKGROUND OF THE INVENTION

Distributed control systems (DCS) were introduced in the market in the 1970s to replace the conventional panelboard systems, which were becoming inefficient. DCS's are now the minimal standard in several industries such as the pulp and paper industry and the petrochemical industry. The purpose of these DCS's is to stabilize flows, pressures, levels etc., to minimize as much as possible the variance in these process variables. Direct repercussions of this minimization are improved product quality and higher production rates.

A typical DCS comprises a network of distributed modules all linked to an operator's terminal. Each module is designed to fulfil a specific process control function and need. Field sensors are wired to a data acquisition system, and the process information is transferred to one or more users (operators) performing specific operating or supervisory functions. The operation of the DCS is coordinated by a database and a network supervisor, while the process is controlled by an operator through a console.

The basic components of a DCS (FIG. 10) are: a data acquisition system (not shown), data communication network 10, at least one display terminal 12 for operator(s), and at least one computer 14 designed to perform automatic control logic. A power supply (not shown) is also generally considered as part of the DCS. These components can be combined in a single device, or in several devices.

There is a crying need in industries in general for a control loop maintenance system. Such need is emphasized for example by Peterson, J. et al. in "Match your control system to your process", The Fadum Report, Vol. 12, No. 3, March 1992, Fadum Enterprises Inc., Norwood, Mass., p. 8, wherein it is stated that "more than 30% of installed control loops are operating in manual, and 65% of the loops operating in automatic produce less variance in manual." Or in Fadum, O., The Fadum Report, supra, p.1, which states that "about 30% of all control loops and 85–90% of level controllers cycle, mostly due to tuning errors. Another 30% of loops induce variability ( . . . ) There are more than 1,000 closed loop controls in our mill, and with each one representing an investment of $30,000–$35,000, we are dealing with a huge sum of money—$35,000,000. When only 54% of these loops are able to function as designed, it means that $16.1 million of the investment in loops is not providing any return at all."

Some systems have been developed for such purpose, for example by Stanfelj et al. in "Monitoring and diagnosing process control performance: the single loop case", Proc. American Control Conference, 1991, 2886–2892. This system is based on a hierarchical approach to control loop diagnosis. At the top level of their approach, all loops in the plant are screened using an analysis of standard deviations, frequency of constraint violations, frequency of alarms, etc. This produces a short list of loops that require further attention. At the second level the control engineer or technician may compare the variance of a loop with that of a minimum variance controller. At the third level, the reasons for the loop's poor performance are identified and corrected. Typical problems with such system are numerous and include controller tuning, inappropriate controller structure, sensor calibration, valve stiction, miswiring, DCS configuration errors, etc.

There is currently no system for continuously monitoring, visualizing, triaging and maintaining all of the loops present in a distributed control system. It would therefore be highly desirable to develop such a system, which could be installed on any DCS available on the market at low cost.

SUMMARY OF THE INVENTION

In accordance with the present invention, there is now provided a process information and maintenance system for continuously monitoring, visualizing, triaging and maintaining all control loops of a distributed control system. More specifically, the present system comprises:

- a distributed control system comprising at least one computer with data acquisition means, storing means and displaying means for acquiring storing and displaying data from at least one sensor and at least one actuator connected thereto; and further comprising automatic control logic means for automatically regulating at least one sensed process value by modifying settings of the at least one actuator;
- a work station comprising a work station computer connected to the at least one computer in the distributed control system, the work station computer comprising:
  a) means for monitoring and acquiring from the at least one computer, the data and settings of each control loop of the distributed control system;
  b) means for processing the information acquired in step a);
  c) means for storing the processed information of step b);
  d) means for triaging the monitored control loops through the stored processed information; and
  e) means for displaying the triaged control loops so that a user is informed of a loop's unusual behaviour;
  whereby all the monitoring, visualizing, triaging and maintaining of the distributed control system are performed at the work station.

IN THE DRAWINGS

Figure 8:
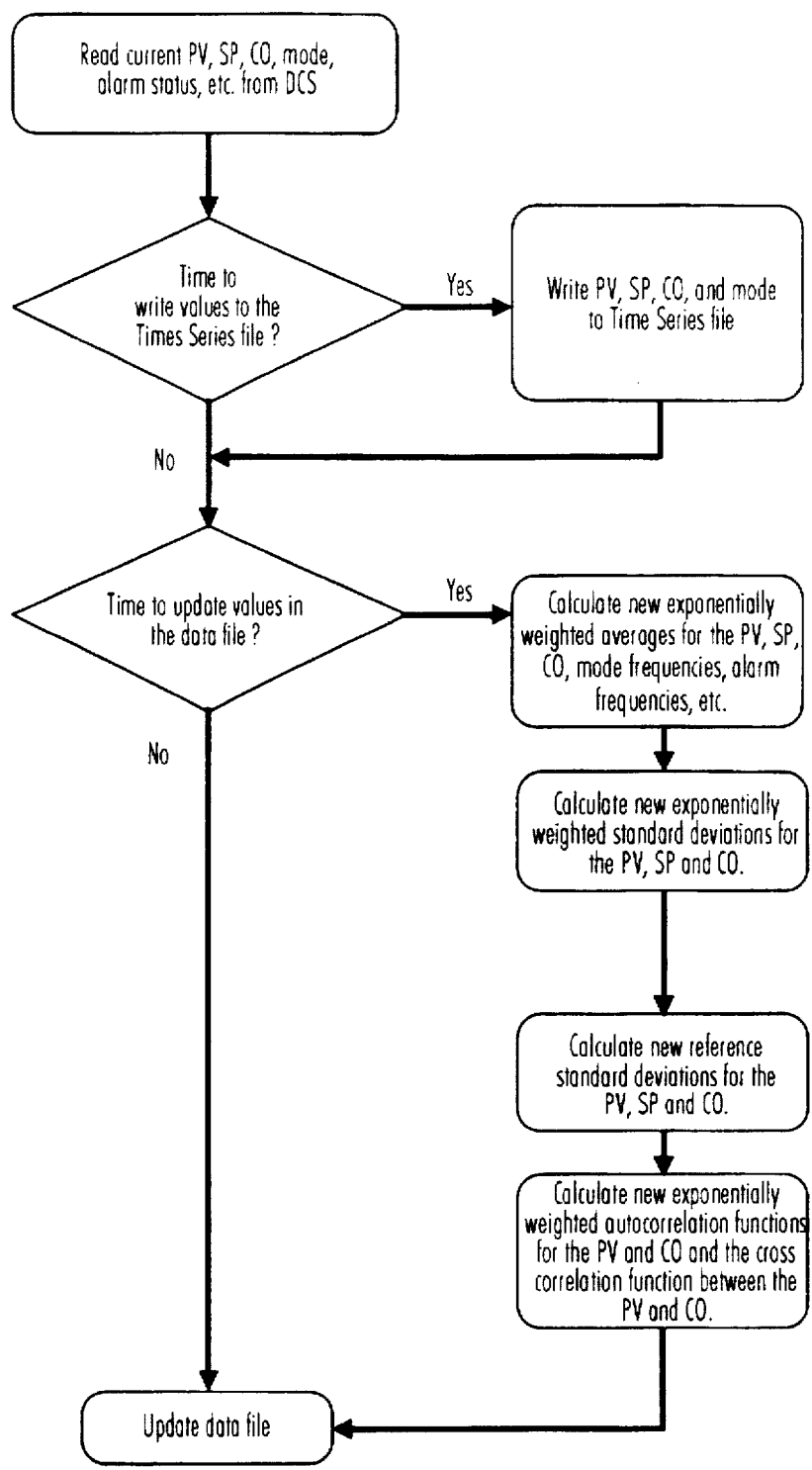

FIG. 8 details the data collection and reduction algorithm; and

Figure 9:
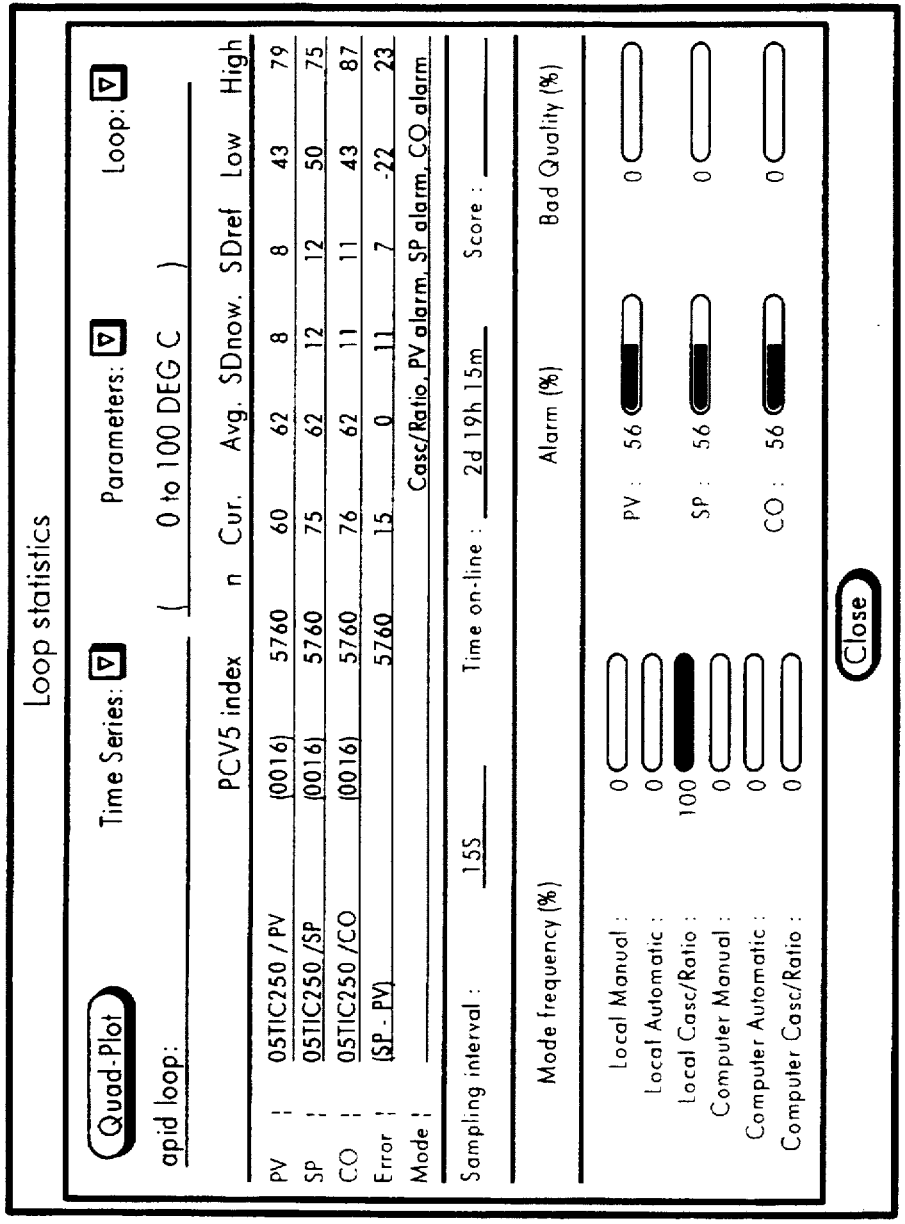

FIG. 9 illustrates a display format of the loop statistics available on the screen of the computer.

Figure 10:
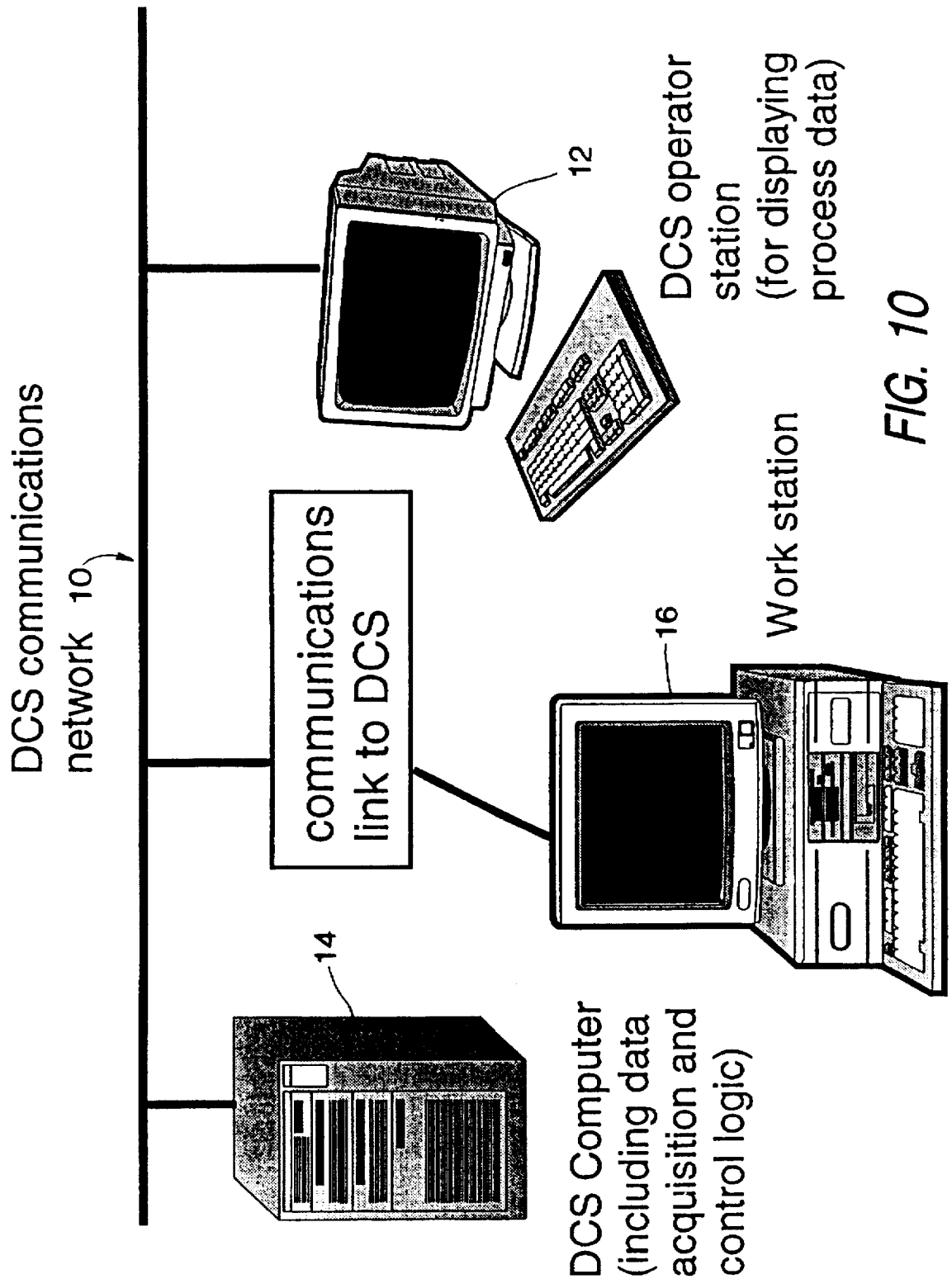

FIG. 10 illustrates a DCS communications network.

DETAILED DESCRIPTION OF THE INVENTION

The system according to the present invention is a maintenance tool for distributed control systems (DCS). As shown in FIG. 10, the present invention comprises a work station 16 coupled to the DCS 10. Among its most useful functions, the present system:

1) automatically identifies all the standard loops, (custom loops such as cascade loops, multiple-input/multiple-output loops, etc. may be manually identified);

2) continuously monitors all loops and recursively calculates the standard deviation of the process variable, average error from setpoint, alarm frequency, correlation coefficients, power spectra, etc.;

3) provides short lists of the loops often in manual mode, often in alarm, loops with a persistent setpoint error, etc.;

4) ranks loops according to their usage in automatic mode, variance, etc.;

5) automatically prints daily or shift reports that identify the loops most in need of maintenance.

The present system allows the continuous monitoring of all control loops and identifies unusual behaviour thereof. Without constant maintenance, all the equipment loses its productivity and value. But the problem is insidious for a DCS because it may comprise hundreds of loops, and thus, the few that perform poorly go unnoticed; and the penury of qualified control engineers makes frequent manual audits impractical. The present system addresses this problem by streamlining maintenance procedures. Among the myriad loops, the present system identifies the few that need immediate remedial action, and does so around-the-clock.

The present system may be designed to work with any distributed control systems. Table 1 illustrates 4 DCS's equipped with the present system, and the system requirements for each DCS:

manufactured and sold by Honeywell, or ABB MASTER (trademark) manufactured and sold by ABB Process Automatic Inc.

Table 2 provides a comparison between a system currently available on the market and the present system. PROTUNER (trade mark) is a system manufactured and sold by Techmation of Tempe, Ariz. A description of the system may be found in *Control System* '92, pages 187–190. As shown in Table 2, the present system has significant advantages over the PROTUNER system, and is much more versatile.

TABLE 2

Comparison between the properties of the present system and that of PROTUNER system

|  | PROTUNER | Present system |
| --- | --- | --- |
| Number of loops | 1–4 | >1000's |
| Data series length | 1–2 hours | days or months |
| Manual/Automatic/RSP/etc. statistics | No | Yes |
| Alarm statistics | No | Yes |
| Saturation | No | Yes |
| Variance tracking | No | Yes |
| Straight-lining | No | Yes |
| Minimum variance index (Harris) | No | Yes |
| Identify problematic loops | No | Yes |
| Installation labour per loop | ½ hour | <5 seconds |
| Installation labour per loop |  | (automatic) |
| Average user training time | 1 week | 1 hour |

The software used in the system of the present invention comprises four programs: A) Data viewing program, B) Data collection and reduction program, C) Communication coordinator program and D) Report program. The data viewing program is an interactive program. It gives the user an access to the loop statistics stored in a data file, allows the user to redefine the data collection time interval, checks the configuration of loops, etc. The user runs the data viewing program only when he needs information about control loops. In contrast, the data collection and reduction program runs continuously and without user interaction. It endlessly collects statistics like averages, standard deviations, covariance coefficients, etc. for all loops. It writes these statistics into the data file.

TABLE 1

| DCS | Bailey NET90[1] | Rosemount System 3[2] | Fisher Provox[3] | Valmet Dramatic[4] |
| --- | --- | --- | --- | --- |
| Computer | 486DX2 66 MHz | 486DX2 66 MHz | VAX | 486DX2 66 MHz |
| Operating system | QNX 4.2 with QNX Windowa 4.20A | QNX 4.2 with QNX Windows 4.20A | VMS 5.2 | QNX 4.2 with Qnx Windows 4.20A |
| Compiler | Watcom C 9.5 | Watcom C 9.5 | VAX C | Watcom C 9.5 |
| Hardware | Computer Interface Unit 04 (CIU) | Supervisory Computer Interface (SCI) | Data Highway Interface (DHI) | Computer Interface Station (CIS) |
| Software | PCV 5.0 | — | CHIP database and programmer's license | XD-Link Library |

[1]Net90 is a trade mark of Elsay Bailey (Canada) Inc., Burlington, Ontario, Canada
[2]Rosemount System 3 is a trade mark of Rosemount Inc., Burnsville, Minnesota
[3]Provox is a trademark of Fisher Controls International Inc., Austin Texas
[4]Damatic is a trade mark of Valmet Automation Inc., Tampere, Finland.

The present system may also be installed on any other DCS systems, such as for example the Foxboro I/A (trademark) manufactured and sold by The Foxboro Company, Foxboro, Mass., or the TDC 3000 (trademark)

The data viewing and data collection programs request information from Communications Coordinator program which in turn obtains the information from the DCS. Report is a non-interactive auxiliary program for reading the data file and generating text-format report files that can then be printed or saved for future reference.

Figure 1:
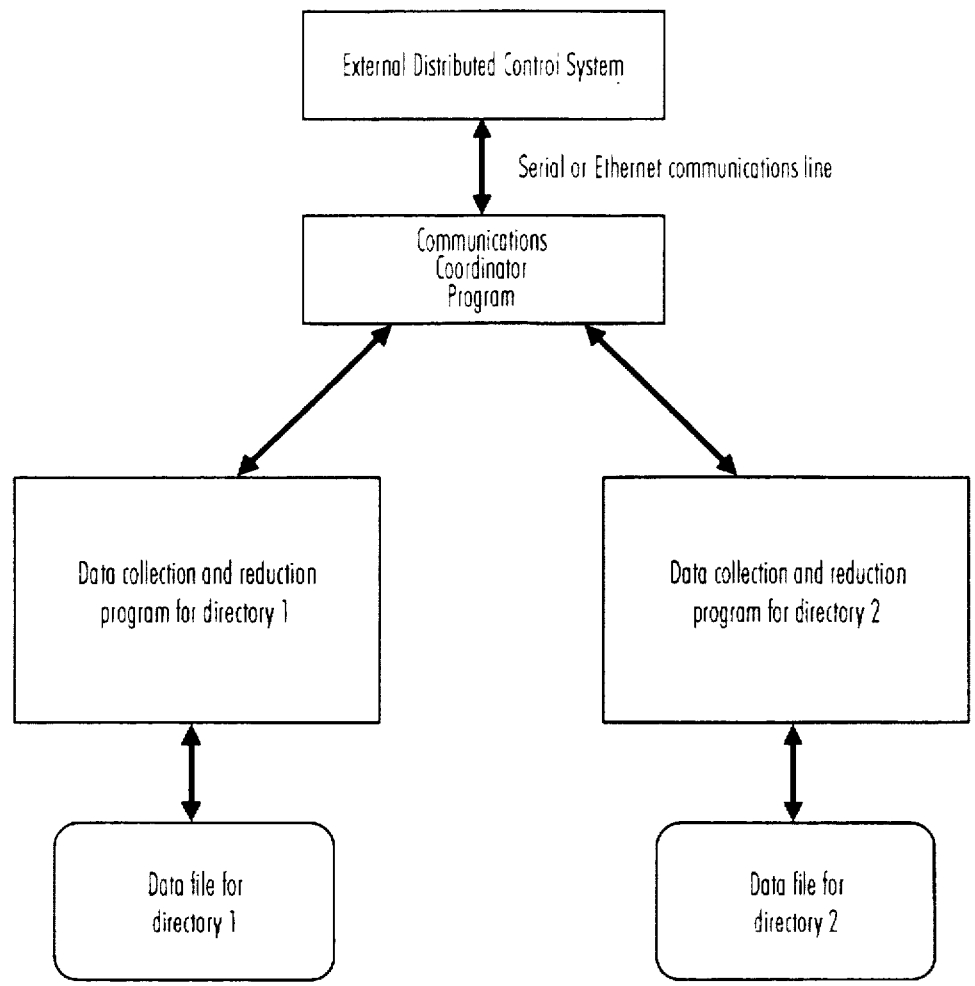
FIG. 1 illustrates the relationship between the data collection and reduction processes and other components according to the present invention.
Figure 2:
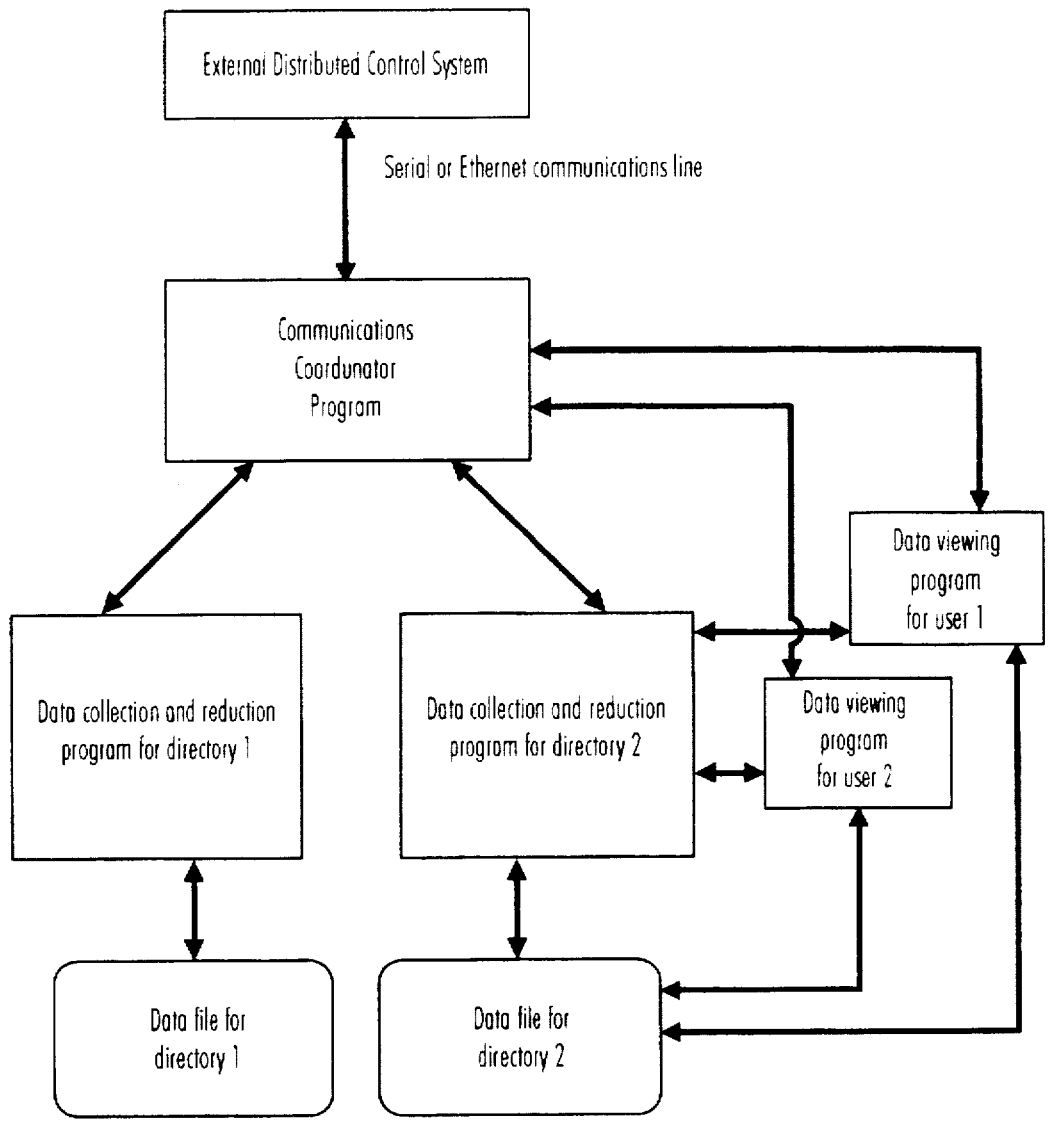
FIG. 2 illustrates the relationship of the data viewing processes to other components.
Figure 3:
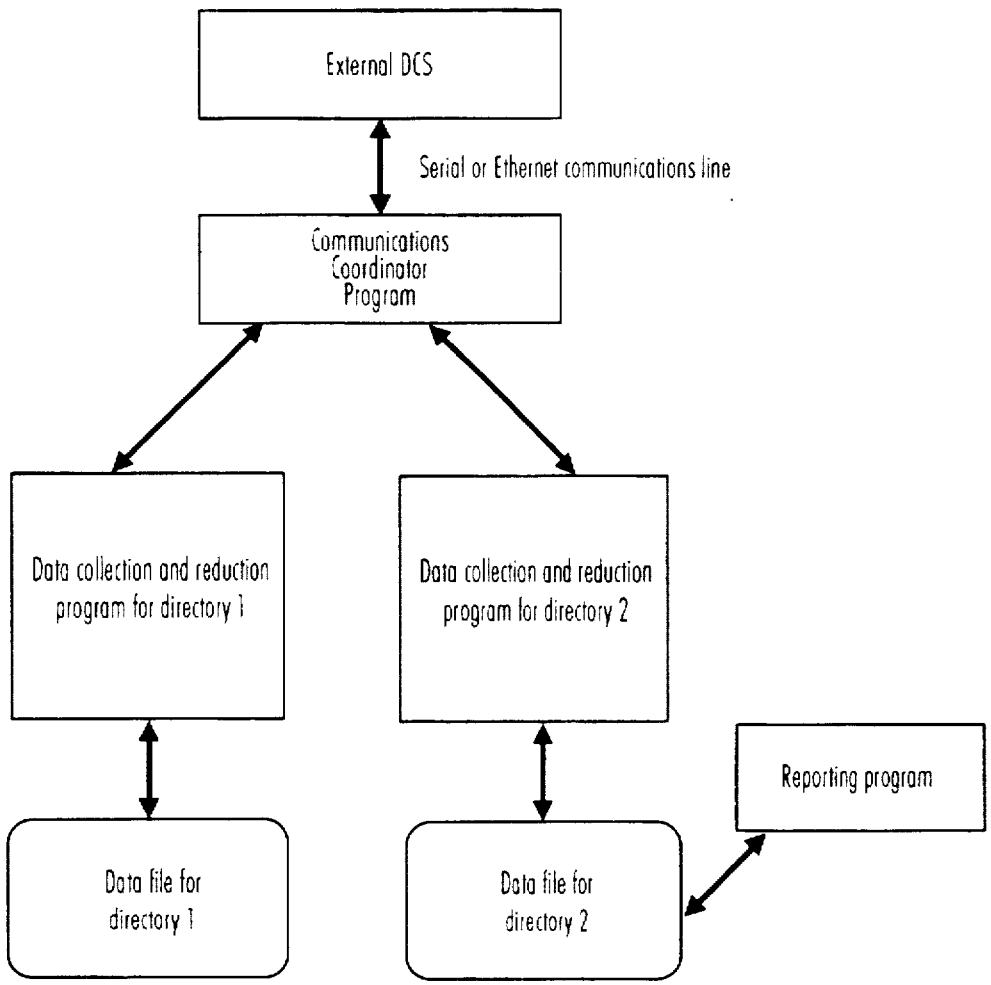
FIG. 3 illustrates the relationship of the reporting program to the other components.
Figure 4:
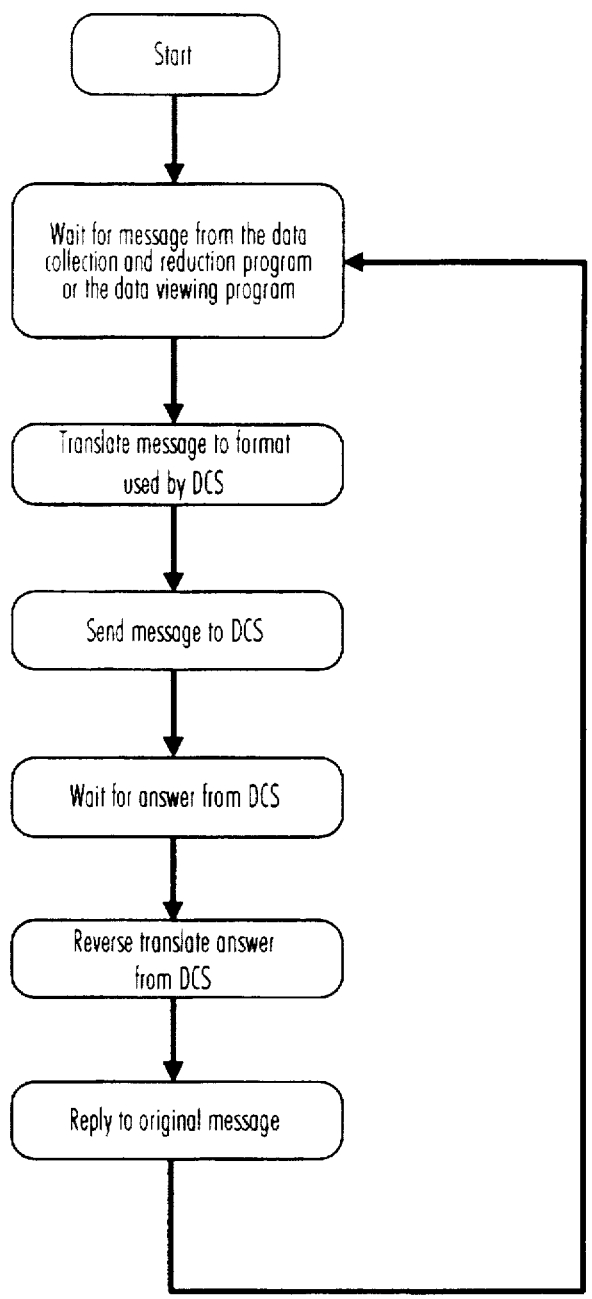
FIG. 4 illustrates the communication coordinator program flowchart.
Figure 5:
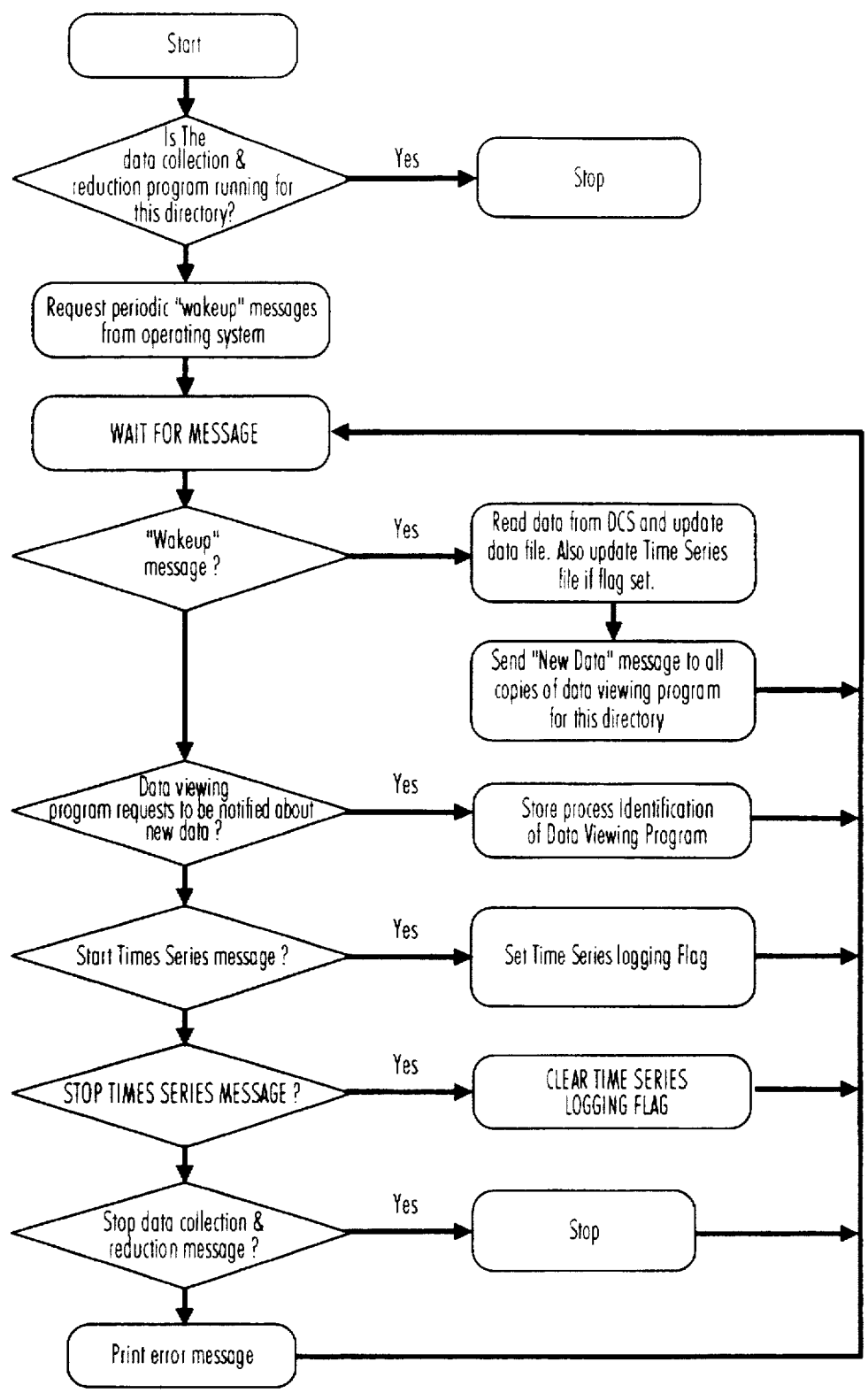
FIG. 5 illustrates the data collection and reduction program flowchart.
Figure 6:
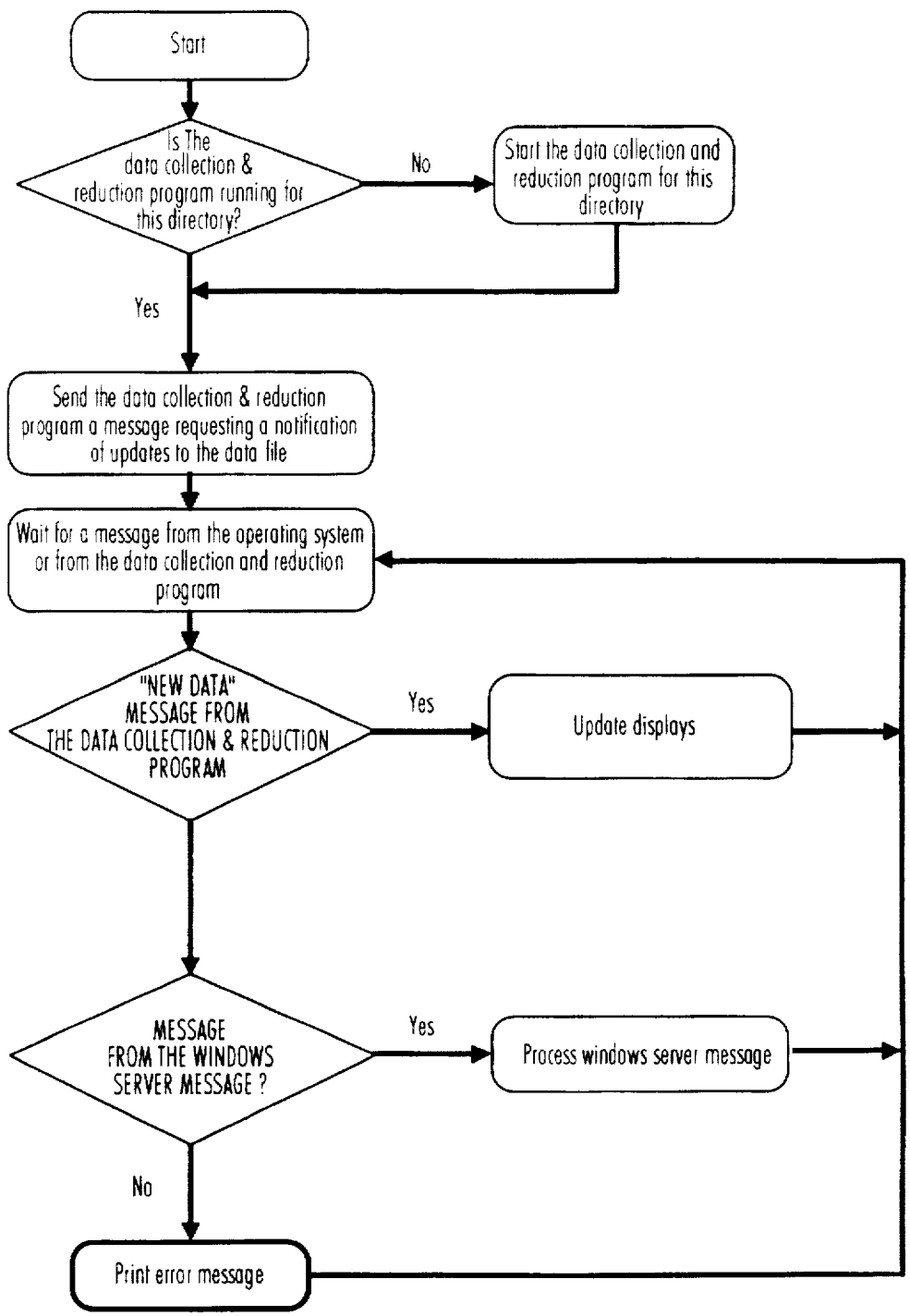
FIG. 6 illustrates the data viewing program flowchart.
Figure 7:
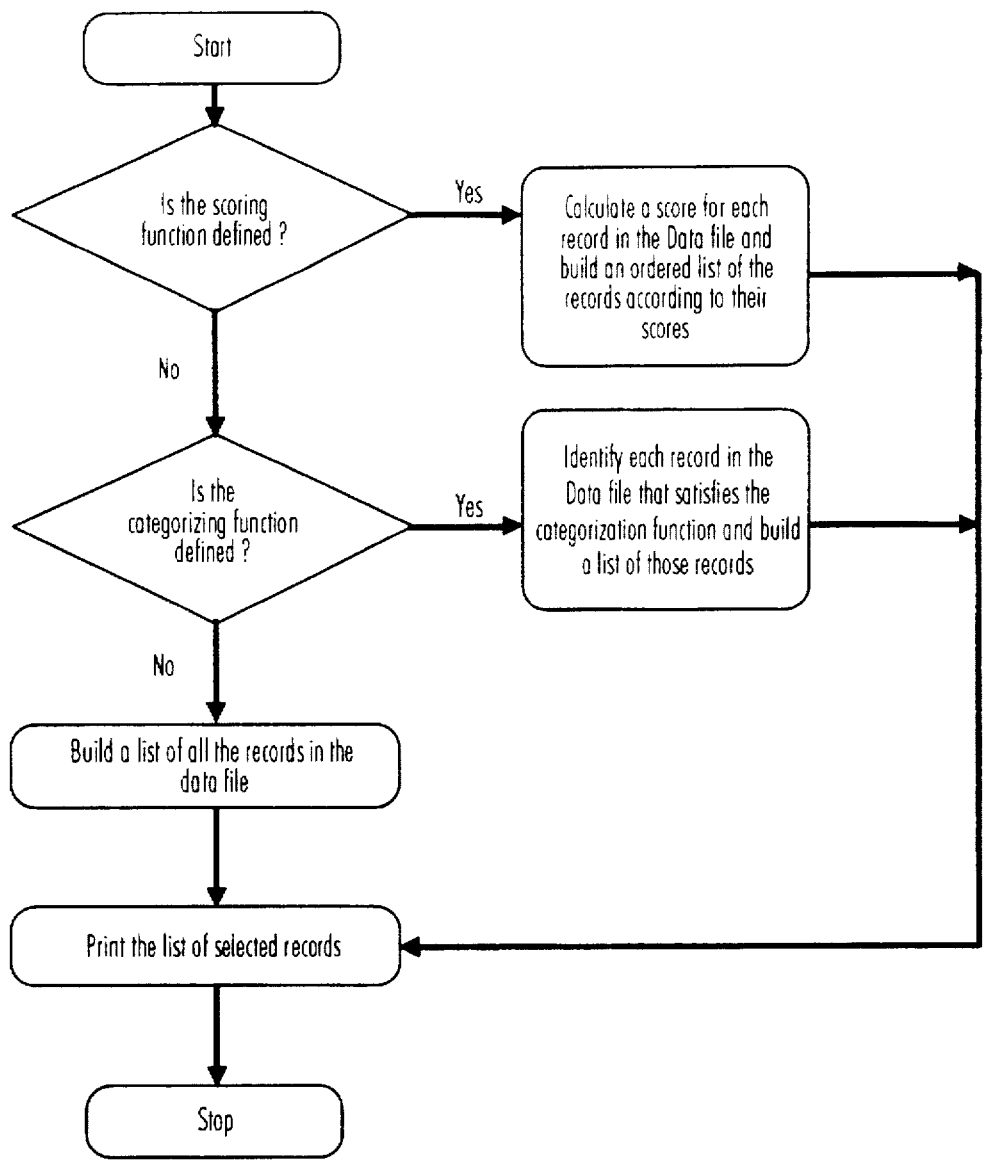
FIG. 7 illustrates the reporting process flowchart.

As illustrated in FIGS. 1–3, arrows indicate that there is communication between the independent software processes. At least one data collection and reduction program will always be present, each one monitoring a set of process variables as defined in the data file of its corresponding directory. The data collection and reduction program is always active. On the other hand, the interactive data viewing program will be active only when started by a user in order to view and interpret the contents of the data file. Each user has its own copy of the data viewing program to view data in the data file, and several data viewing programs may look into the same data file concurrently. The Report is noninteractive and the program may be initiated, when a report is required, by the user or automatically by the computer operating system, for example, daily reports.

As illustrated in FIG. 1, the invention requires that information flow between the DCS, the communications coordinator program, the data collection and reduction programs and the data file. In this figure, the flow of information is represented by arrows. Note that no two programs need necessarily run in the same physical computer. Data collection and reduction is an on-going process that continues indefinitely. At least one such program is always active. However, as shown, several copies of the data collection and reduction program may run independently, each collecting data for its own data file.

Users run an interactive data viewing program to inspect the data files, as illustrated in FIG. 2. The data viewing program also provides means for editing the contents of the data file, setting parameters, etc. For example, the data viewing program will query the DCS for a list of loops and update the data file as required. The figure shows that each user can activate his own copy of the data viewing program. Therefore, the system may have several simultaneous users.

As an alternative to the interactive data viewing program, users may run a reporting program to analyze and summarize the contents of the data file (FIG. 3). The relationship of the reporting program to the other programs is shown in this Figure.

The sequence of each program is illustrated in FIGS. 4–8. Given that several copies of the data collection and reduction program and several copies of the data viewing program may all simultaneously be requesting information from the DCS, a communications coordinator is required to arbitrate the flow of information (see FIGS. 1 and 2). The communications coordinator also translates messages between the format used in the particular DCS and the format used in the data collection and reduction program or the data viewing program. These functions are illustrated in the flowchart of this Figure.

FIGS. 5–8 illustrate respectively the algorithm for data collection and reduction, the algorithm of the data viewing program, the algorithm of the reporting program, and the details of the algorithm used by the data collection and reduction program to calculate averages, covariance coefficients, etc.

Data File

The data file contains a record for each loop being monitored. Not all control loops need necessarily be represented in the data file. The user has complete freedom to specify which loops are to be monitored. The data file contains both static and dynamic information about each loop. Static information includes loop configuration parameters such as the descriptor, engineering units zero, engineering units span, etc. as well as the data viewing program parameters such as the sample window, sampling period, etc. These values are set by the data viewing program when a record is created in the data file. Dynamic information includes the current value of the process variable (PV), the standard deviation of the controller output (CO), etc. These values are updated by the data collection and reduction program during each sampling period.

Loop Statistics

FIG. 9 illustrates what appears on the computer screen whenever a user wishes to consult the statistics for a given loop. The terms appearing therein are defined as follows.

Number of Observations

The column labelled "n" shows the "effective" number of observations used to calculate the average and current standard deviation. This will depend on how long the data collection and reduction program has been running, the size of the short term sample window, the controller mode, etc. The value of "n" for the setpoint (SP) and error may be less than that for the process variable, controller output and mode. This is because observations of the setpoint and error are counted only when the loop is not in manual mode.

Current Value

The column labelled "Cur." gives the current values of the process variable, setpoint controller output, setpoint error and controller mode. The units for the process variable and setpoint may be either engineering units (feet, tph, etc.) or percent. The units for the controller output are preferably in percent.

Averages

The column labelled "Avg." gives averages. These averages are calculated using the following recursive formula found in Young, P., "Recursive Estimation and Time-Series Analysis", Springer-Verlag, New York, 1984.

$$\bar{x}_n = \bar{x}_{n-1} + \frac{1}{\omega} (x_n - \bar{x}_{n-1}) \quad (1)$$

Here, $x_n$ denotes the current value of the process variable from sensor (PV), setpoint (SP), etc. at time n and $\bar{x}_n$ denotes the average value. During startup, $\omega$ equals the number of observations. Later, $\omega$ equals the "sampling window" W. This allows the estimated average to stabilize quickly and then begin discounting the oldest information using exponential-weighting-into-the-past (EWP). W is typically equal to the number of samples in a twenty-four hour period.

$$\omega = n, \quad n < W \quad (2)$$
$$\phantom{\omega} = W, \quad n \geq W$$

The sampling window defines the approximate number of values that contribute to the average. Calculation of the average setpoint and average error is suspended when the loop is in manual mode. This is necessary because the setpoint is undefined when the controller is in manual mode.

Standard Deviations

The column labelled "SDnow" gives current standard deviations based on the same sampling window, typically twenty-four hours, used to calculate the averages above. These standard deviations are calculated using the following recursive method.

$$s_n^2 = s_{n-1}^2 + \frac{1}{\omega} (e_n^2 - s_{n-1}^2) \quad (3)$$

-continued $$e_n = x_n - \bar{x}_n$$

Here, $s_n$ denotes the standard deviation of the PV, SP, etc. at time n and $e_n$ denotes current difference from the current average value. The parameter ω is as defined about for the calculation of averages. Calculation of the standard deviations of the setpoint and setpoint error is suspended when the loop is in manual mode. This is necessary because the setpoint is undefined when the controller is in manual mode. Differencing does not affect the calculated standard deviations. Differencing applies only to the calculation of the covariance function and power spectra.

Reference Standard Deviation

The column labelled "SDref" shows the "reference standard deviation." It is calculated using the same recursive method used for the standard deviation "SDnow" above. However, the sampling window for the reference standard deviation is typically much larger, on the order of the number of samples in a six-month period. This longer-term reference standard deviation is useful for detecting loops that deteriorate slowly either because of failing instrumentation or a drift in process parameters (e.g., ore grade, process deadtime, etc.). It is also useful in a statistical process control context where the operator is looking for unexplained increases in the process variance. Calculation of the reference standard deviation for the setpoint and setpoint error is suspended while the current value or average value is saturated or when the loop is in manual mode.

Range

The columns labelled "Low" and "High" show the lowest and highest values recorded. Recording of the low and high values for the setpoint and error is suspended when the loop is in manual mode.

Controller Mode

The line for the controller mode indicates the current mode (Man, Auto, RSP, etc.). The definition of allowable modes varies according to the DCS vendor, but Manual (Man), Automatic (Auto) and Remote Setpoint or Cascade (RSP) can be considered common.

Sampling Interval

The sampling interval is the actual time interval for data collection for a given loop. It will be the larger of data collection and reduction program's scan interval and the "sampling interval" parameter defined for the loop. It is always rounded to a multiple of the data collection and reduction program's scan interval. Effective diagnosis requires the proper sampling period for each loop. Therefore, the user may choose a different sampling period for each loop. For loop diagnosis, the sampling period should be a reasonable fraction of the process time constant. The data viewing program reads the Proportional-Integral-Derivative (PID) controller reset time to provide default values for the sampling interval. The user may tailor the sampling interval for each loop.

Computer hardware limitations place the fastest processes beyond the reach of the data collection and reduction program. To achieve the flexibility required to handle the remaining loops, the data collection and reduction program cycles as quickly as possible, usually every 5 seconds. As part of each cycle, the program checks the sampling period defined for each loop. If the statistics of a loop are due to be updated, then the data collection and reduction program obtains new information and revises the statistics for that loop. If a loop is not due to be updated, then the data collection and reduction program does not bother obtaining new information for that loop. This procedure both reduces the load on the computer and provides the necessary flexibility in the sampling period.

Controller Mode Frequencies

The section presents the percentage of time that the controller is used in each of the defined modes. These percentages are calculated using the now familiar recursive formula.

$$\bar{x}_n = \bar{x}_{n-1} + \frac{1}{\omega} (x_n - \bar{x}_{n-1}) \tag{1}$$

Here, $x_n$ equals 1 if the controller is currently in mode n or 0 if it is not, and $\bar{x}_n$ denotes the average fraction of time that the controller is operated in mode n. The sampling window for controller modes is typically the number of samples in a six-month period.

Alarm Frequencies

The Alarm Frequencies presents the percentage of time that the process variable, setpoint, controller output are in alarm. These percentages are calculated using the same recursive formula $$\bar{x}_n = \bar{x}_{n-1} + \frac{1}{\omega} (x_n - \bar{x}_{n-1}) \tag{1}$$

Here, $x_n$ equals 1 if the variable is currently in alarm or 0 if it is not, and $\bar{x}_n$ denotes the average fraction of time that the variable is in alarm. The sampling window for alarm frequencies is typically the number of samples in a six-month period.

Time Series Analysis

The invention provides the following time series analysis functions. Table 3 shows examples of these functions. PV stands for process variable (e.g., measured flow), CO stands for controller output (e.g., valve opening).

TABLE 3

| Time Domain | Frequency Domain |
| --- | --- |
| Autocorrelation of PV and CO | Power spectrum of PV and CO (units of %²-seconds) |
| Cross correlation between PV and CO | Cross amplitude spectrum of PV and CO (units of %²-seconds) |
| Time Series of PV and CO | Phase spectrum between the CO and PV (units of radians) |
| | Squared coherency spectrum |

A time series is a sequence of values measured over time. For example, the minute-by-minute pressures in a steam line are time series. Time series are useful because they may reveal trends or cycles that allow future values to be forecast. Control systems that predict the level in a tank are more likely to keep the tank from overflowing.

However, forecasts are not always perfect, since time series include a random element. For this reason, time series are often called stochastic. The characteristic feature of a time series is that its future behaviour cannot be predicted exactly. For example, it is not possible to exactly predict the future value of the measured water level in a tank because (1) all methods of measurement are subject to random errors, and (2) the tank may have an unknown leak, feed stream, etc.

Time Domain

Autocovariance and Cross Covariance

The cross covariance function measures the strength of the relationship between the current value of an input variable and the future values of an output variable. If the cross covariance function shows that a relationship is strong, then that information is useful for forecasting and control. The reliability of a forecast usually decreases for times further and further in the future. In other words, the strength of the relationship between values decreases as the lag time becomes larger. The cross covariance function is proportional to the impulse response function. As such, it gives information about the process dead time and steady state gain. Autocovariance is a special case of cross covariance where the input and output variables are the same. The data collection and reduction program calculates the covariance coefficients using the following recursive method.

$$c_{xy}(k)_n = c_{xy}(k)_{n-1} + \frac{1}{\omega} \ |e_{x,n}e_{y,n+k} - c_{xy}(k)_{n-1}| \quad (4)$$

Here, $c_{xy}(k)$ denotes the cross correlation coefficient between x and y at lag k. Note that the autocorrelation coefficient $c(k)$ is equivalent to the cross correlation of x with itself $c_{xx}(k)$. The value of $e_{x,k}$ depends on the user's choice of differencing. Without differencing $e_{x,k}$ (and therefore $c_x(k)$ ) is dependent on $\bar{x}_n$.

$$e_{x,n} = x_n - \bar{x}_n \quad (5)$$

With differencing, $e_{x,k}$ (and therefore $c_x(k)$ )does not depend on $\bar{x}_n$.

$$e_{x,n} = x_n - x_{n-1} \quad (6)$$

Autocorrelation and Cross Correlation

The autocorrelation function and cross correlation function are normalized versions of the autocovariance and cross covariance functions. The autocorrelation and cross correlation functions are unitless, and vary from −1 to +1.

Differencing

If the raw series of data is not stationary, then differencing may produce a stationary series. When a loop's differencing assumption is set to drifting, the data collection and reduction program calculates the differenced value at time t. A differenced value is interpreted as the slope, rate of change or velocity. The data collection and reduction program recursively estimates cross covariance coefficients.

Minimum Variance Controllers

Minimum variance control is known to be the best possible control in the sense that no linear controller can have a lower variance. It provides a convenient bound on achievable performance against which the performance of other controllers can be compared. Although PID controllers dominate in a typical DCS, the testing for minimum variance control is still useful.

Visual inspection of the autocorrelation function is a test for minimum variance control. When a process is under minimum variance control, the autocorrelation function is zero for all lags greater than the process deadtime. Consequently, a minimum variable controller reduces the order of the moving-average process. If the process is under minimum variance control, then the autocorrelation function is zero beyond the deadtime lag.

Additionally, the data viewing program calculates a minimum variance performance index that describes how closely the controller approaches the performance of a minimum variance controller. The calculation of the minimum variance index begins by estimating a moving average model for the time series of the process variable.

$$x_n = \Psi_1 a_{(n-1)} + \Psi_2 a_{(n-2)} + \cdots \quad (7)$$

Here, the $\Psi_i$ are polynomial coefficients in a moving-average model of the time series $x_n$. Under minimum variance control, a process $x_n$ with deadtime b lags has an autocovariance function given by the following finite summation.

$$c_x(k) = \sigma_a^2 \sum_{j=0}^{b-1} \Psi_j \Psi_{j+k} \quad (8)$$

Harris et al. in *Can. J. Chem. Eng.*, 1992, 70, 1186–1197 shows that the model parameters $\Psi_0$ to $\Psi_{b-1}$ are independent of the controller. Therefore, these parameters can be found from routine process data without implementing a minimum variance controller. Moreover, it is only necessary to accurately estimate the first b model coefficients $\Psi_0$ to $\Psi_{b-1}$. This is a straightforward task using standard regression algorithms. Given the moving average model for the process under minimum variance control, the minimum variance is the autocovariance at lag 0.

$$\sigma_{mv}^2 = \sigma_a^2 \sum_{i=0}^{b-1} \Psi_i^2 \quad (9)$$

Comparing the minimum variance $\sigma^2_{mv}$ to the measured variance $\sigma^2_x$ provides an index of performance $$\eta(b) = \frac{\sigma_x^2 - \sigma_{mv}^2}{\sigma_x^2} \quad (10)$$

Frequency Domain

The autocovariance function and cross covariance function interpret time series in the time domain. The power spectra and cross spectrum are the frequency domain equivalents. In process engineering, oscillations are usually undesirable. Spectral analysis is a method of identifying those terms or frequencies which are most important. From that information, the reasons for the oscillations may be identified and corrected. In this way the most important process disturbances are eliminated first. The data viewing program calculates spectra on-demand by taking the Fourier transform of the covariance (see Bendat et al. *"Engineering Applications for Correlation and Spectral Analysis"*, John Wiley and Sons, New York, 1993, p. 50).

$$C_{xy}(m) = \Delta \sum_{k=-L}^{L} w(k) c_{xy}(k) e^{-j\pi \frac{m}{F} k}, \quad m = -F, \ldots, 0, 1, \ldots, (F-1) \quad (11)$$

Here, $C_{xy}(m)$ is the cross spectrum of x and y at frequency $m/(2F\Delta)$.

$\Delta$ is the time interval between samples.

$1/(2F\Delta)$ defines the fundamental frequency.

$w(k)$ is a windowing function of the lag k,

L is the largest lag with a non-zero value in the windowing function.

For a times series of N observations, $x_1, x_2, \ldots x_N$, F must be no greater than N/2.

The spectrum $C_{xy}(m)$ is a two-sided spectrum with both negative and positive frequencies. For convenience, the one-side spectrum $P_{xy}(m)$ is often defined.

$$\begin{aligned} P_{xy}(m) &= C_{xy}(m), & m = 0 \\ &= 2 C_{xy}(m), & m = 1, \ldots, (F-1) \\ &= C_{xy}(m), & m = F \end{aligned} \quad (12)$$

The data viewing program provides a spectral interpretation of the minimum variance performance. Given that $C_{xx}(m)$ describes the power in the frequency range $m/(2F\Delta)$ ±(½){1/(2FΔ)}, the variance contained in each frequency range is:

$$\sigma_x^2(m) = C_{xx}(m)\frac{1}{2F\Delta}, \quad m = 0 \quad (13)$$
$$= 2C_{xx}(m)\frac{1}{2F\Delta}, \quad m = 1,\ldots,(F-1)$$
$$= C_{xx}(m)\frac{1}{2F\Delta}, \quad m = F$$

The performance index η(b,m) is then:

$$\eta(b,m) = \frac{\sigma_x^2(m) - \sigma_{mv}^2(m)}{\sigma_x^2}, \quad m = 0,1,\ldots,F \quad (14)$$

Here, $\sigma^2_{mv}(m)$ denotes the variance at frequency m, under minimum variance control, $\sigma^2_x(m)$ denotes the measured variance at frequency m, and $\sigma^2_x$ denotes the total measured variance over all frequencies. Dividing by the total measured variance serves to normalize the index.

Summing the indices η(b,m) returns the overall index η(b):

$$\eta(b) = \sum_{m=0}^{F} \eta(b,m) \quad (15)$$
$$= \frac{\sigma_{total}^2 - \sigma_{mv}^2}{\sigma_{total}^2}$$

Convergence

For stochastic signals, the sample spectrum does not converge to the theoretical spectrum no matter how much data is used. As more data are accumulated, the new information is used to estimate the spectrum for more frequency channels rather than improve the estimate for existing channels. Thus, the number of estimated values in the spectrum increases linearly with the number of data points.

Spectral Analysis Parameters Menu

The data viewing program gives the user three parameters that control the variance of the estimated spectral values. The parameter denoted F determines the fundamental frequency 1/(2FΔ) and therefore the number of discrete frequencies between 0 and the Nyquist frequency 1/(2Δ). Higher values of F provide better spectral resolution but introduce more bias into the estimated spectrum.

The lag window size and lag window function parameters control the leakage of power to adjacent channels. This leakage occurs whenever discrete rather than continuous data is used. In practice, most texts recommend the "Bartlett" window function and a large value for the window size. Large values for the lag window size will increase the variance of the spectral estimates but minimize bias. Conversely, small values for the lag window size reduce the variance of the spectral estimated, but tend to bias the estimated spectra, e.g., introduce low frequency values.

Aliasing

When a high frequency signal is sampled at a low frequency, spectral analysis will indicate a low frequency oscillation instead of the true high frequency oscillation. If there is any doubt about the frequency, then the sampling period for that loop has to be increased.

Categories

To quickly identify the loops that are faulty or inefficiently operated, the present system will search through the statistics for all loops and make a short list of loops that meet certain criteria. Examples of definitions of each option follow. These are only examples to illustrate the present system, and should not be construed as limiting the scope of the invention.

Insufficient PV Observations

A loop has an insufficient number of process variable observations when the number of observations n for the PV is less than the loop's sample window W. When n<W, it indicates that:

1) the loop was recently added to the data file;
2) the loop was recently zeroed manually; or
3) the data collection and reduction program had problems communicating with the DCS.

Insufficient Setpoint Observations

A loop has an insufficient number of setpoint observations when the number of observations n for the setpoint SP is less than the loop's sample window W. When n<W, it indicates that:

1) the loop was recently added to the data file;
2) the loop was recently zero-ed manually;
2) the data collection and reduction program had problems communicating with the DCS; or
4) the loop is usually in manual mode.

Often Not in Intended Mode

A loop is often not in its intended mode when it spends a significant amount of time in a mode other than its intended mode. For example, if a loop's intended mode is AUTOMATIC, but the loop is frequently in MANUAL, then the loop is often not in its intended mode.

Often in Any Alarm

A loop is often in any alarm when its PV, SP or CO is often in alarm.

Average PV Near Limit

A loop's average PV is near the limit when:

1) there is a sufficient number of observations of the PV; and
2) the average value of the PV is close to the HIGH SCALE value or LOW SCALE value configured in the DCS.

Average CO Near Limit

A loop's average CO is near the limit when:

1) there is a sufficient number of observations of the CO; and
2) the average value of the controller output is near 0 or 100%.

Persistent Error Bias (Offset)

A loop has a persistent error bias when:

1) it is not often in manual mode;
2) there is a sufficient number of observations of SP; and
3) the absolute value of the average error (SP–PV) is greater than twice the standard deviation of the average error.

The standard deviation of the average error is equal to the standard deviation (SDnow) of the error divided by the square root of the number of observations n. In this case, the number of observations n is the lesser of the actual number of observations and the sample window.

Increasing PV Variance

A loop has an increasing PV variance when:

1) there is a sufficient number of observations of PV; and
2) the current standard deviation (SDnow) of the process variable is more than twice the reference standard deviation (SDref).

Increasing Error Variance

A loop has an increasing error variance when:

1) it is not often in manual mode;
2) there is a sufficient number of observations of SP, and
3) the current standard deviation of the error is more than twice the reference standard deviation.

Negligible PV Variance

A loop has negligible PV variance when the current standard deviation (SDnow) of the PV is a very small. A stable but otherwise normal loop may have a PV variance of exactly 0 if the DCS only updates values when they change by more than a "deadzone" value.

Negligible CO Variance

A loop has negligible CO variance when the current standard deviation SDnow of CO is very small.

Rankings

As an alternative to categorization, the present system can search through the statistics for all problematic loops and sort them according to certain criteria to identify those loops that most need attention. Examples of criteria for ranking include maximum Harris performance index, minimum variance index, PV power, wrong mode, PV variance, SP error variance, CO variance, critical alarms, total alarms, PV saturation, CO saturation, SP error persistence, PV variance increase, setpoint error variance increase, error variance increase, or any other criterion determined by the user. After the user has selected a criterion, the data viewing program calculates a "score" for each loop and then sorts the loops according to that score. Loops with the lowest score top the list Loops with no data, or high score, are forced to the bottom of the list.

The definition of each of the above criteria is as follows:

Maximum Harris Performance Index

It compares the current variance of the PV to the hypothetical variance under minimum variance control. This index compares the variances at each frequency f. When the index is 0, the two variances are equal. When the index is 1.0 the variance is very far from minimum variance. When the index is −1, the variance is better than minimum variance (at the frequency f). The user may assign a loop deadtime, which has a large influence on the value of the index. For each loop, the score assigned by the data viewing program is the inverse of the largest value of the index over all frequencies f.

Minimum Variance Index

It compares the current variance of the PV to the hypothetical variance under minimum variance control. When the index is 0, the two variances are equal. When the index is 1.0 the variance is very far from minimum variance. For each loop, the score assigned by the data viewing program is the inverse of the index.

PV Power

A loop's score is proportional to the ratio of the total power minus the power in the dominant channel to the total power. If much of the PV's power is concentrated in one frequency channel, then the loop's score will be low and top the list. If a loop has a negligible PV variance or if it is often used in manual mode, then it is given an arbitrarily high score.

Wrong Mode

A loop's score is the percentage of time it spends in its intended mode. For example, if a loop's intended mode is remote setpoint (RSP) and it spent 10% of the time in manual, 20% in automatic and 70% in RSP, then its score is 70. Loops which are not usually in their intended mode will have a low score and will top the list. Loops that are always in their intended mode are given an arbitrarily high score.

PV Variance

A loop's score is proportional to the inverse of the variance (in percent of span units) of its process variable. If a loop has a negligible PV variance, then it is given an arbitrarily high score.

Setpoint Error Variance

A loop's score is proportional to the inverse of the variance of its setpoint error (in percent of span). If a loop has a negligible setpoint variance or if it is often used in manual mode, then it is given an arbitrarily high score.

CO Variance

A loop's score is proportional to the inverse of the variance of its controller output. If a loop has a negligible CO variance, then it is given an arbitrarily high score.

Critical Alarms

A loop's score is the percentage of time that none of its critical alarms are set. A loop that is never in alarm is given an arbitrarily high score.

Total Alarms

A loop's score is the percentage of time that none of its critical alarms or advisory alarms are set A loop that is never in alarm is given an arbitrarily high score.

PV Saturation

A loop's score is the magnitude of the difference between the average PV and the high or low limit, whichever is closer (percent units).

CO Saturation

A loop's score is the magnitude of the difference between the average CO and 0 or 100 whichever is closer.

Setpoint Error Persistence (Offset)

A loop's score is proportional to the ratio of the current standard deviation of the average error to the absolute value of the average error. The current standard deviation of the average error is equal to the standard deviation (SDnow) of the error divided by the square root of the number of observations n. In this case, the number of observations n is the lesser of the actual number of observations and the sample window. If a loop is often used in manual mode, the loop is given an arbitrarily high score.

PV Variance Increase

A loop's score is proportional to the ratio of the PV's reference variance $SDref^2$ to the PV's current variance $SDnow^2$. If SDnow is less than SDref, then the loop is given an arbitrarily high score.

Setpoint Error Variance Increase

A loop's score is proportional to the ratio of the setpoint error's reference variance $SDref^2$ to the setpoint error's current variance $SDnow^2$. If a loop is often used in manual mode, or if SDnow is less than SDref, then the loop is given an arbitrarily high score.

Time Series Data Collection

The present system, through the data collection and reduction program, will save time series data for one or more loops. The data is preferably saved to an ASCII format file, but may be saved in any other format. In this file, the process variable, setpoint and controller output variables are always given in percent of span. The time series data collection menu allows you to select which loop(s) to log, the time interval between observations, the number of observations and the file name. It is also used to start and stop time series data logging. The resolution of the "Time interval between observations" is limited to the monitoring time interval of the data collection and reduction program. This is because the time series data is collected by the data collection and reduction program.

Loop Definitions

A loop definition must preferably include all of the following parameters.

Tagname and Block Variable

The loop definition must include a tagname and block variable for the process variable, setpoint and controller output. The present system needs the tagname and block variable to read the corresponding values from the DCS, and uses the PV's mode as the loop's mode. The error is defined as the setpoint minus the process variable. Usually, all the values share a common tagname, but this is not necessary. The ISA (SA-S5.1 Instrument Symbols and Identification, Copyright 1984 by the Instrument Society of America) standard for tagnames consists of:

1) a first letter designating the measured variable (e.g. F for flow, T for temperature, etc.);
2) one or more succeeding letters identifying the functions performed (e.g., I for indicate, IC for indicate and control);
3) a hyphen followed by an arbitrary suffix (e.g., -345).

Sampling Interval

The sampling interval is the time, preferably in seconds, between reading new values for the PV, SP, etc. Any loop's sampling interval may be larger than this, but it must be evenly divisible by the monitoring time interval of the data collection and reduction program.

Sample Window

The sample window is approximately the number of values used to calculate the average and standard deviation. When the sample window is small, values are soon forgotten. When the sample window is large, values affect the average for a long time.

Intended Mode

The intended mode parameter is used to detect loops that the operator is not using as they were intended. Examples of valid entries for this parameter are: Man, Auto, RSP, Sup, DDC (Direct Digital Control), Com (Computer Control) or Hman (Hard Wired Manual). For most loops, the appropriate value is Auto. The most common exception is the slave in a cascade loop, which intended mode is remote setpoint (RSP) for any DCS.

Signal Sharing

The signal sharing parameter is used to identify data file records that must share their process variable (PV) or controller output (CO). If a control system contains only single-input/single output (SISO) control loops, then all data file records must correspond to SISO loops and none share a process variable or controller output. However, if the control strategy includes multiple-input/multiple-output (MIMO) loops, then a process variable or controller output is shared between two or more data file records. The present system can monitor multiple-input/multiple-output control loops. In this case the user must:

1) decompose the MIMO process into a set of single-input/single-output couplings;
2) set the "Signal sharing" parameter to MIMO for all data file records couplings that share a process variable or controller output.

Number of Correlation Lags

The number of correlation lags parameter controls the size of the data file record used for the loop and the calculational burden imposed on the data collection and reduction program for the calculation of covariance coefficients. If the number of correlation lags is 0, then data collection and reduction program does not allocate file space for covariance coefficients and does not devote any time to their calculation. However, the user also cannot inspect any time series functions such as the autocorrection function, cross covariance function, power spectrum, etc. If the number of correlation lags is 11 (for example, then the data collection and reduction program will save covariance coefficients for lags 0 to 10 inclusive.

Differencing Assumption

The differencing assumption parameter effects the differencing that the data collection and reduction program applies to data used to calculate covariance coefficients. When the parameter has the value 'Stationary', the data collection and reduction program does not difference the data. When the parameter is 'Drifting', the data collection and reduction program differences the data.

Ranking Weight

The ranking weight alters the way that the present system ranks loops. The most important loops should have the highest values for their ranking weights. After the data viewing program calculates the raw score for a loop, it divides the raw score by the loop's ranking weight and uses the resultant quotient as the final score. Consequently, in some instances, an important loop with a minor problem may be listed ahead of a less important loop with a serious problem.

Data File Configuration and Maintenance

Deleting Loops

Deleting a loop irrevocably deletes the currently selected loop definition from the data file. To help recover from the accidental use of this option, the data viewing program first dumps the loop definitions to a file, preferably an ASCII file, before erasing all loops. To recover the loop definitions you need only load the loop definitions from the ASCII file.

Zeroing Loops

Zeroing a loop sets to zero all sample counts, averages, standard deviations, controller mode frequencies and alarm frequencies. The statistics then reflect only the most recent data for the loop.

Initializing Loops

Initializing a loop first zeros the loop then additionally reinitializes the Auto-Regressive Moving Average (ARMA) model parameters.

Streamlining the Data File

The "Streamline file" option rewrites the data file (often removing null records), checks tagnames and initializes all loops.

Adding Loops

Loops may be defined in the data file in a number of ways, namely, manually, automatically according to the loop type, automatically according to information in an ASCII file, etc. Although the manual method is convenient for a small number of loops, it becomes tedious if a large number of loops must be defined or changed. When many loops must be defined, the "Add all PID blocks" option is the quickest method. It searches for all station blocks type records in the PCV database. When an appropriate record is found, the data viewing program then checks for a match in the data file. If no match exists, data viewing program automatically creates a corresponding entry in the data file. This eliminates any tedious configuration of loops and ensures that the present system monitors all loops.

The third method of defining loops in the data file is with the "Load from ASCII file" option. It reads preferably in an ASCII coded file of loop definitions. If the file contains new loop definitions, they are added to the data file. If the file contains definitions for loops already in the data file, then the data file loops are updated with the sampling interval, sample window, etc. parameters from the file.

For each loop, the data viewing program expects to find, in order:

1) the identity (tagname and station parameter) of the process variable;
2) the identity of the setpoint;
3) the identity of the controller output;
4) the sampling interval, preferably in seconds;
5) the sample window (number of intervals);
6) the intended mode (MAN, AUTO, RSP, . . . );
7) the dead time (number of intervals);
8) the type (SISO or MIMO);
9) the differencing assumption; and
10) the ranking weight.

The division of loops according to plant area may be appropriate when different instrument technicians have responsibility for different plant areas. The data viewing program processes only one data file at a time, therefore, each technician sees only the loops in one plant area. Alternatively, you may divide loops according to their time constants: fast loops in one data file, slow loops in another. This strategy reduces the amount of disk file access. When all loops are contained in a single data file, the data collection and reduction program must scan the entire data file with a scan interval appropriate to the fastest loop. However, if there are two data files, each data file is scanned by its own copy of data collection and reduction program, then the file of slow loops is accessed much less frequently.

Reporting

The reporting program is a non-interactive, alternative to the interactive menu-driven data viewing program. Report reads the data file and generates reports in a format file, preferably ASCII, which can then be printed to produce a hardcopy report. The user defines the report criteria and format through C-language subroutines. Any of the Loop Doctor program's categorization and ranking functions can be used. Or, the user can specify his own categorization or ranking function.

While the invention has been described in connection with specific embodiments thereof, it will be understood that it is capable of further modifications and this application is intended to cover any variations, uses or adaptations of the invention following, in general, the principles of the invention and including such departures from the present disclosure as come within known or customary practice within the art to which the invention pertains, and as may be applied to the essential features hereinbefore set forth, and as follows in the scope of the appended claims.

What is claimed is:

1. A process information and maintenance system for continuously monitoring, visualizing, triaging and maintaining all control loops of a distributed control system, comprising:

a distributed control system comprising at least one computer with data acquisition means, storing means and displaying means for acquiring, storing, and displaying data from at least one sensor and at least one actuator connected thereto; and further comprising automatic control logic means for automatically regulating at least one sensed process value by modifying settings of the at least one actuator, said distributed control system monitoring process functions;

a work station comprising a work station computer connected to the at least one computer in the distributed control system for monitoring control system functions of said distributed control system, the work station computer comprising:
 a) means for monitoring and acquiring the data and settings of each control loop of the distributed control system from the at least one computer;
 b) means for processing the information acquired in step a);
 c) means for storing the processed information of step b);
 d) means for triaging the control loops monitored through the stored processed information; and
 e) means for displaying the triaged control loops so that a user is informed of a loop's unusual behavior;

said work station computer monitoring, visualizing, triaging, and maintaining the distributed control system.

2. A system according to claim 1 wherein the distributed control system comprises a plurality of terminals connected to the at least one computer.

3. A system according to claim 1 wherein the means for acquiring data in the work station computer contains a record for each loop being monitored, the record comprising both static and dynamic information about the loop.

4. A system according to claim 1 wherein the distributed control system contains single-input/single output (SISO) control loops, multiple-input/multiple-output (MIMO) control loops, or both.

5. A system according to claim 1 wherein loops may be defined in the processing and storing means of the work station computer either manually, automatically according to the loop type or automatically according to information in a file.

6. A system according to claim 1 wherein the process information and maintenance system for monitoring, visualizing, triaging and maintaining all control loops of a distributed control system does one or more of the following:

automatically identifies all the standard loops, continuously monitors all loops and recursively calculates standard deviation of the process variable, average error from setpoint, alarm frequency, correlation coefficients and power spectra;

provides short lists of the loops often in manual mode, often in alarm, or loops with a persistent setpoint error;

ranks loops according to their usage in automatic mode, variance; and automatically prints daily or shift reports identifying the loops most in need of maintenance.

7. A system according to claim 1 wherein the distributed control system is a Bailey Net90, a Rosemount System 3, a Fisher Provox, a Valmet Damatic XD, a Foxboro I/A, a Honeywell TDC 3000, or an ABB Master.

* * * * *